(No Model.)
A. F. SKINNER.
THILL COUPLING.
No. 314,733. Patented Mar. 31, 1885.
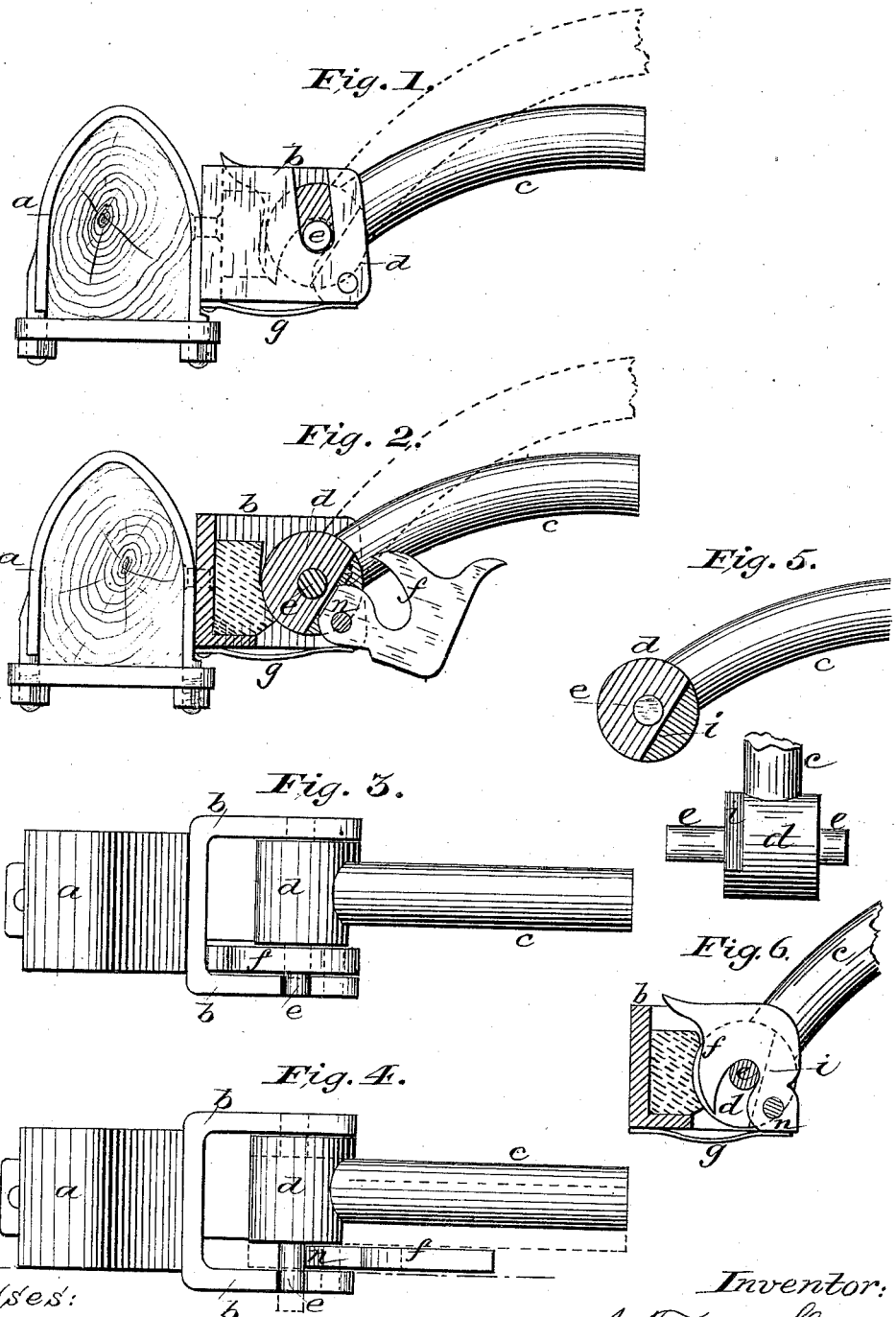

United States Patent Office.

A. FRANK SKINNER, OF TAMA CITY, IOWA, ASSIGNOR OF ONE-HALF TO ROBERT E. AUSTIN, OF SAME PLACE.

THILL-COUPLING.

SPECIFICATION forming part of Letters Patent No. 314,733, dated March 31, 1885.

Application filed August 8, 1884. (No model.)

*To all whom it may concern:*

Be it known that I, A. FRANK SKINNER, a citizen of the United States, residing at Tama City, in the county of Tama and State of Iowa, have invented new and useful Improvements in Thill-Couplings, of which the following is a specification.

My invention relates to improvements in couplings for the thills and poles of carriages; and the objects of my improvement are to provide a safe coupling, to render the coupling easily and quickly effected in changing the shafts for the pole, and to simplify the construction, whereby provision is made for perfect safety without the use of screw bolts and nuts.

Referring to the accompanying drawings, Figure 1 represents a cross-section of the axle with my improved coupling applied thereto and secured; Fig. 2, a similar view showing the securing-latch thrown back to permit the uncoupling; Fig. 3, a top view of Fig. 1; Fig. 4, a top view of Fig. 2; Fig. 5, the coupling end of the shafts or thills, showing the notch in the end which permits the sidewise movement of the thill-irons within the clip-lugs to allow the thills to be removed when required; and Fig. 6, a section showing the latch closed.

The clip-irons $a$ may be of any suitable construction and be secured to the axle by any suitable fastening.

The clip-lugs $b$ are adapted to receive the coupling ends of the shafts, not with a close fit between the lugs, but to permit of a side movement of each shaft-iron within the lugs to effect the coupling and the uncoupling, in connection with a latch, and this is the feature which constitutes my improvement. Each shaft-iron $c$ has a cylindrical end, $d$, with a pin, $e$, which fits in bearings in the lugs. The pin on one side is longer than the pin on the other side of the iron $d$, and the bearing in the clip-lug is open at the top to allow this long end of the pin to be set down in place and the shafts to be moved sidewise to place the short pin in its closed bearing, while keeping the long pin in its open bearing-lug; and for this purpose the pin is fixed in the iron $d$, and the latter is of a length in the line of the pin less than the width of the space between the lugs, so that the iron $d$ fits closely against the inner side of the lug, which forms the bearing for the short pin. The space between the lug and the iron $d$ at the long end of the pin is to allow a latch, $f$, pivoted to the lug, to be turned down over the long end of the pin, between the lug and the end of the iron $d$, with a close fit, to prevent the thill-iron from being moved sidewise, and thus securely lock its bearing-pins in the lugs. In this locked position the latch $f$ is held by a spring, $g$, arranged in any suitable way. As shown, the latch is pivoted to the lower outer corner of the lug, so that when latched with shaft-iron pin it fits snugly over the top of the pin in the space between the iron $d$ and the lug, and the spring $g$ exerts a force to hold the latch in place, so as to close the open lug-bearing and form a retainer for the shaft-iron.

The provision for uncoupling the shafts consists in notching the outside ends of the shaft-irons $d$ at a point, $i$, in front of the bearing-pins, and in forming the pivoted ends of the latches at $n$ so as to allow the shafts to be moved sidewise over the latches, as shown by dotted lines in Fig. 4, only when the front ends of the shafts are depressed below their normal height when in use. It is therefore impossible to effect the uncoupling when the horse is hitched in the shafts, even though the latches may become unlatched and thrown back, because in this position the latches would rest upon their springs, so as to prevent the alignment of the notches $i$ with the latch ends, and consequently the latches would still act to retain the pins in the lugs by preventing sidewise movement of the shafts.

The pivoted ends of the latches and the notches $i$ are so formed that the sidewise sliding of the shafts to effect their uncoupling can only be made when the latches are unlatched and the shafts lowered to a certain point, which must always be below that which they occupy when in use. In all other positions of the shafts their irons fit against some part of the inner side of each latch, so that while the coupling is thereby made secure it is adapted for quickly changing the shafts for the tongue, and vice versa.

Any suitable spring may be used to prevent the rattling of the coupling.

While I prefer to form the notches $i$ in the thill-irons in the described relation to the ends $n$ of the latches, so that the thills can only be uncoupled when lowered below the point at which they are used, yet it is obvious that the relation of the notches and catches may be changed, so as to require the thills to be raised above the point at which they are used to allow them to be uncoupled.

I claim—

1. The combination of the clipped thill-coupling, one lug whereof having an open bearing and the other a closed bearing, and the thill-iron having a long and a short bearing-pin, with a catch adapted to fit over the long pin between one of the lugs and the thill-iron, whereby to lock the short pin in its bearing, substantially as herein set forth.

2. The thill-iron having the long and short bearing-pins and an end notch, in combination with the clipped coupling, one lug whereof has an open bearing and the other a closed bearing, and a catch pivoted to the lug between said lug and the notched end of the thill-iron, substantially as described, for the purpose specified.

3. In a thill-coupling, the combination of the clip-iron and the thill-iron $d$, having the end notch, $i$, with the latch $f$, and a confining-spring, $g$, for said latch, constructed and arranged substantially as herein set forth.

4. The thill-iron having a long and a short bearing-pin and an end notch, $i$, combined with a clip-iron having an open bearing in one of its lugs, and a pivoted catch adapted to close the said open bearing, and when open to bring its end into alignment with the thill-iron notch $i$, substantially as and for the purpose set forth.

In testimony whereof I have hereunto set my hand in the presence of two subscribing witnesses.

A. FRANK SKINNER.

Witnesses:
W. C. MURRAY,
C. H. CARMICHAEL.